March 11, 1924.
M. C. OVERMAN
CUSHION TIRE
Filed Jan. 18, 1921
1,486,603
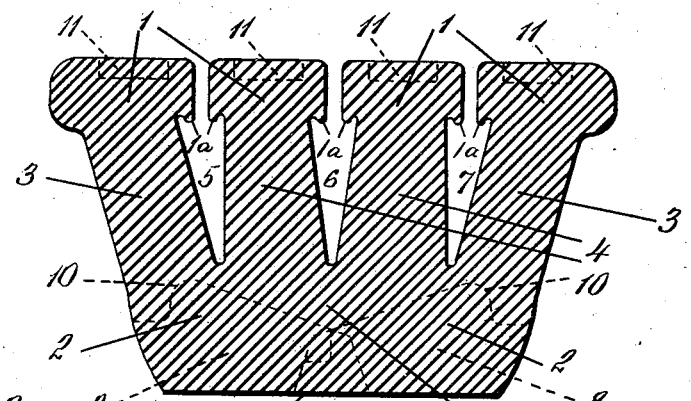
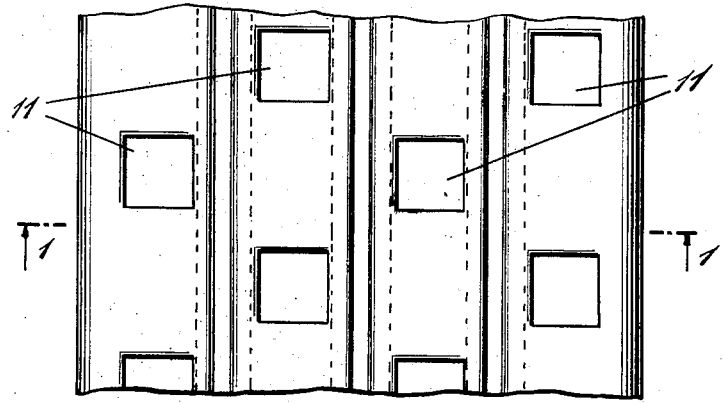
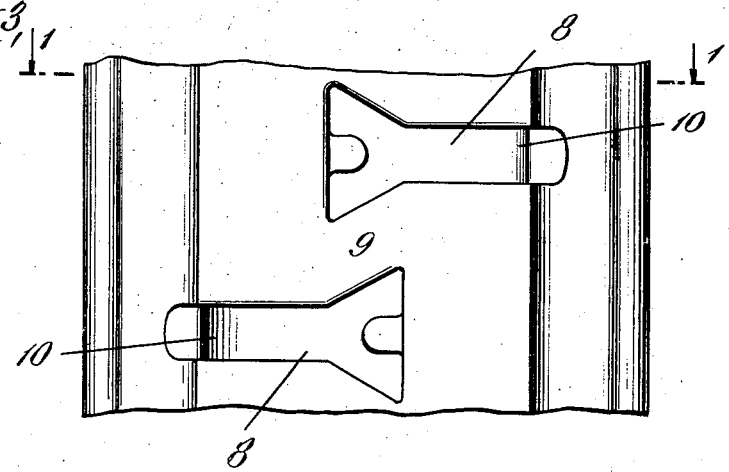
Inventor
Max Cyrus Overman
By his Attorney verging in the direction of the tread with the inner being more vertical than the outer, the aforesaid base-portion providing ledges at said spaces that are engageable to secure the tire to the wheel.

8. A cushion tire which comprises the combination of a tread-portion, a base-portion, and a plurality of substantially straight outer and inner walls, laterally separated from each other by spaces extending circumferentially around the tire and tapering to apices at the tread-portion, said walls integrally joining said tread- and base-portions, and all of said walls and spaces converging in the direction of the tread with the inner being more vertical than the outer; the aforesaid tread-portion being provided with a circumferential series of tread recesses extending transversely therein from opposite sides of the tire through substantially half the width of the tread and extending upwardly under the aforesaid members and spaces.

9. A cushion tire comprising a wheel-engaging base portion and a flange-free lower portion formed integrally therewith, said lower portion comprising inner and outer substantially straight space-separated force-resisting and transmitting members united by a tread portion, all of said members converging towards one another in the direction of said tread portion which has a wide ground contact to deliver the thrusts from the tread well under all of said inner and outer members, all of which thicken laterally under load and expand into said spaces without bending collapse.

10. A cushion tire comprising a wheel-engaging base portion and a flange-free lower portion formed integrally therewith, said lower portion comprising inner and outer substantially straight space-separated force-resisting and transmitting members united by a tread portion, all of said members converging towards one another in the direction of said tread portion which has a wide ground contact to deliver the thrusts from the tread well under all of said inner and outer members, all of which thicken laterally under load and expand into said spaces without bending collapse, said outer members being more inclined to the vertical than the inner members.

11. A cushion tire comprising the combination with a tread portion of a base portion integrally joined to said tread portion by a plurality of force-resisting and transmitting inner and outer members, said inner members being substantially straight and laterally separated from each other and from the outer members by spaces into which they may expand when compressed, all of said members converging towards one another in the direction of said tread portion, the outermost of said members being more inclined to the vertical to increase the lateral stability of the tire.

12. A cushion tire comprising the combination with a tread portion of a base portion embodying multiple base members severally integrally joined to said tread portion by a plurality of force-resisting and transmitting inner and outer members, said inner members being substantially straight and laterally separated from each other and from the outer members by spaces opening through the base of the tire into which they may expand when compressed, all of said members converging towards one another in the direction of said tread portion.

13. A cushion tire comprising the combination with a tread portion of a base portion embodying multiple base members severally integrally joined to said tread portion by a plurality of force-resisting and transmitting inner and outer members, said inner members being substantially straight and laterally separated from each other and from the outer members by spaces opening through the base of the tire into which they may expand when compressed, all of said members converging towards one another in the direction of said tread portion, the outer members being more inclined to the vertical to increase the lateral stability of the tire.

14. A cushion tire comprising a wheel-engaging base portion and a flange-free lower portion formed integrally therewith, said lower portion comprising inner and outer substantially straight space-separated force-resisting and transmitting members united by a tread portion, all of said members converging towards one another in the direction of said tread portion which has a wide ground contact to deliver the thrusts from the tread well under all of said inner and outer members, all of which thicken laterally under load and expand into said spaces without bending collapse, said tread portion being provided with a circumferential series of tread recesses extending transversely therein from opposite sides of the tire through substantially half the width of the tread and extending upwardly under the aforesaid members and spaces.

15. A cushion tire comprising the combination with a tread portion of a base portion integrally joined to said tread portion by a plurality of force-resisting and transmitting inner and outer members, said inner members being substantially straight and laterally separated from each other and from the outer members by spaces into which they may expand when compressed, all of said members converging towards one another in the direction of said tread portion, the outermost of said members being more inclined to the vertical to increase the lateral stability of the tire, said tread portion being provided with a circumferential series of tread recesses extending transversely therein from opposite sides of the tire through substantially half the width of the tread and extending upwardly under the aforesaid members and spaces.

16. A cushion tire comprising the combination with a tread portion of a base portion embodying multiple base members severally integrally joined to said tread portion by a plurality of force-resisting and transmitting inner and outer members, said inner members being substantially straight and laterally separated from each other and from the outer members by spaces opening through the base of the tire into which they may expand when compressed, all of said members converging towards one another in the direction of said tread portion, said tread portion being provided with a circumferential series of tread recesses extending transversely therein from opposite sides of the tire through substantially half the width of the tread and extending upwardly under the aforesaid members and spaces.

In testimony whereof, I have signed my name to this specification, this seventeenth day of January, 1921.

MAX CYRUS OVERMAN.

March 11, 1924.  1,486,489
T. JOHANCEN ET AL
TRUCK FOR HANDLING ROLLS OF PAPER
Filed Dec. 27, 1922  2 Sheets-Sheet 2
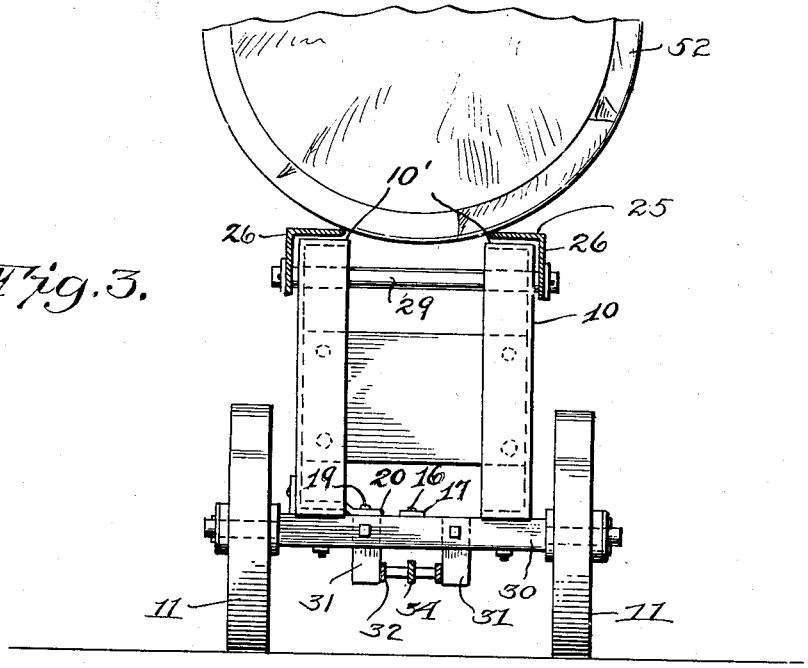
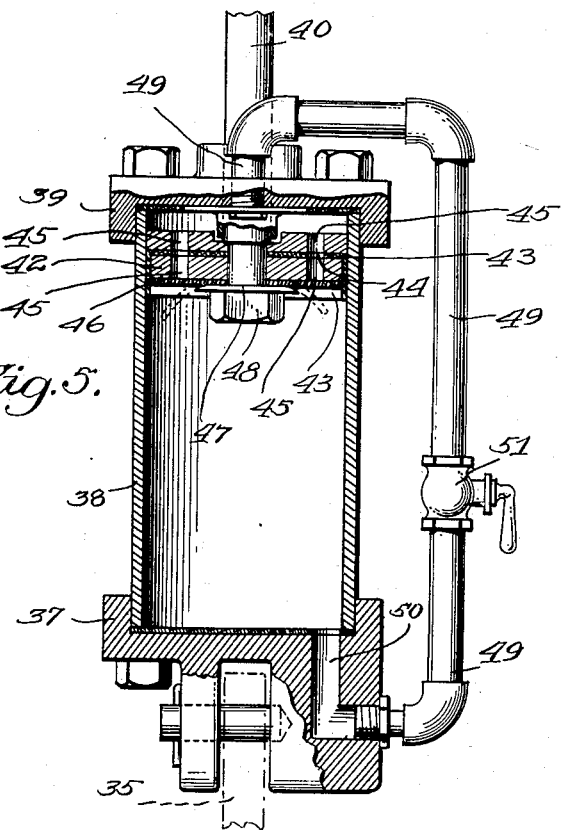
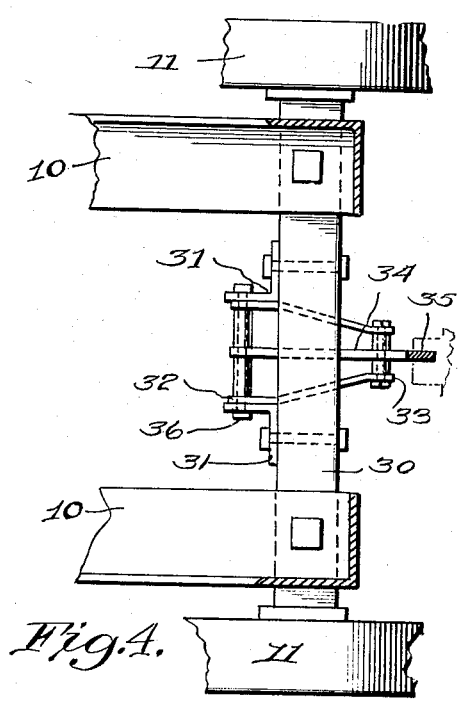
Inventors
Thomas Johancen
Edward Kehoe
By Mann & Co.
Attorneys